(12) United States Patent
Lee

(10) Patent No.: US 9,167,507 B2
(45) Date of Patent: Oct. 20, 2015

(54) CELL RESELECTION METHOD AND MOBILE TERMINAL USING THE SAME

(75) Inventor: Ki-tae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1985 days.

(21) Appl. No.: 11/770,551

(22) Filed: Jun. 28, 2007

(65) Prior Publication Data

US 2008/0004025 A1 Jan. 3, 2008

(30) Foreign Application Priority Data

Jun. 30, 2006 (KR) .................. 10-2006-0060752

(51) Int. Cl.
   *H04W 48/16* (2009.01)
   *H04W 48/20* (2009.01)
(52) U.S. Cl.
   CPC .............. *H04W 48/16* (2013.01); *H04W 48/20* (2013.01)
(58) Field of Classification Search
   USPC ................................................. 455/436, 437
   See application file for complete search history.

(56) References Cited

U.S. PATENT DOCUMENTS

| 7,299,045 | B2 * | 11/2007 | Hsu et al. | .......... 455/437 |
| 2006/0030324 | A1 | 2/2006 | Hsu et al. | |
| 2007/0191044 | A1 * | 8/2007 | Kostic et al. | .......... 455/522 |

FOREIGN PATENT DOCUMENTS

| EP | 1032234 | | 8/2000 | |
| EP | 1 089 581 | * | 9/2000 | .............. H04Q 7/38 |
| KR | 1020000067762 | | 11/2000 | |
| KR | 1020010084686 | | 6/2001 | |
| KR | 1020030019826 | | 3/2003 | |

* cited by examiner

*Primary Examiner* — Michael Faragalla
(74) *Attorney, Agent, or Firm* — The Farrell Law Firm, P.C.

(57) ABSTRACT

A cell reselection method and mobile communication terminal using the method are disclosed. The method includes calculating first path loss parameters of a serving cell and neighboring cells; determining whether the serving cell is suitable for a communication service using the first path loss parameter thereof; performing, if the serving cell is determined to be unsuitable, a cell reselection operation; calculating, if no suitable cell is found through the cell reselection operation, a second path loss parameter of the serving cell using information on the distance from a base station of the serving cell to the mobile communication terminal; redetermining whether the serving cell is suitable using the second path loss parameter thereof; and setting an operation mode of the mobile communication terminal on the basis of the redetermination result. As a result, errors in determination of the suitability of the serving cell may be reduced.

16 Claims, 4 Drawing Sheets

CELL RESELECTION METHOD AND MOBILE TERMINAL USING THE SAME

PRIORITY

This application claims priority to an application entitled "CELL RESELECTION METHOD AND MOBILE TERMINAL USING THE SAME" filed in the Korean Intellectual Property Office on Jun. 30, 2006 and assigned Serial No. 2006-0060752, the contents of which are incorporated herein by reference.

BACKGROUND OF THE INVENTION

1. Field of the Invention

The present invention relates generally to cell reselection and, more particularly, to a cell reselection method using a base station's distance information, and to a mobile communication terminal using the cell reselection method.

2. Description of the Related Art

Generally, mobile communication terminals communicate with a mobile communication network through radio cells. Movement of a mobile communication terminal between cells may result in cell switching. Cell switching occurs in, for example, a handover procedure or a cell reselection procedure. Movement of a mobile communication terminal, while in an on-going call, causes the network to perform a corresponding handover procedure for sustenance of the call. A mobile communication terminal, while in an idle mode, may perform a cell reselection procedure to find a better serving cell.

Referring to FIG. 1, the cell reselection procedure is described below.

A mobile communication terminal begins the procedure by calculating C1 path loss parameters (path loss criteria) of a serving cell (or a current cell) and neighboring cells at regular intervals at step S105. Thereto the mobile communication terminal periodically measures the power of a broadcast channel signal of each cell. For example, in a Global System for Mobile Communications (GSM) system or General Packet Radio Services (GPRS) system, a mobile communication terminal repeatedly measures at least every 5 seconds the power of a signal on a broadcast control channel (BCCH) of each of a serving cell and neighboring cells in order to calculate corresponding C1 path loss parameters.

The C1 path loss parameter of a cell is calculated using the following Equation 1:

$$C1 = RXLEV - RXLEV\_ACCESS\_MIN - \mathrm{Max}(0, MS\_TXPWR\_CCH - P) \quad (1)$$

where RXLEV denotes a received signal level of the BCCH signal of the cell, RXLEV_ACCESS_MIN denotes the minimum received signal level for access to the cell, MS_TXPWR_CCH denotes the maximum transmitting power that the mobile communication terminal is permitted to use for access to the cell, and P denotes the maximum transmitting power of the mobile communication terminal.

RXLEV is a value measured by the mobile communication terminal, RXLEV_ACCESS_MIN and MS_TXPWR_CCH are values received from a corresponding base station, and P is a value specific to the mobile communication terminal.

After calculation of the C1 path loss parameters, the mobile communication terminal determines whether the C1 path loss parameter of the serving cell is less than zero at step S110. If the C1 path loss parameter of the serving cell is less than zero, the mobile communication terminal performs a cell reselection operation at step S115. It is considered impossible for a mobile communication terminal to receive a communication service from a cell whose C1 path loss parameter is less than zero, owing to a large amount of path loss in the cell.

If at least one suitable cell that can provide a communication service is found through the cell reselection operation at step S120, the mobile communication terminal selects one of the found suitable cells as a new serving cell at step S125, and receives a communication service from the new serving cell in step S130.

If no suitable cell is found, the mobile communication terminal enters into a no-service mode at step S135.

In such a conventional cell reselection procedure, the suitability of a serving cell for a communication service is determined on the basis of a corresponding C1 path loss parameter that is calculated under the control of a mobile communication terminal. However, different mobile communication terminals that are receiving services from the same serving cell may obtain different results in determination of the service suitability of the serving cell. That is, when mobile communication terminals that are different, for example in design model or manufacturer, are located at an identical service area where an electric field is weak, some of the mobile communication terminals may determine the serving cell to be suitable and others may determine the serving cell to be unsuitable.

This is because a C1 path loss parameter of the serving cell calculated by a mobile communication terminal may be different from that calculated by another mobile communication terminal. Different mobile communication terminals may have different degrees of precision in their components and different internal processing algorithms according to design models or manufacturers. Hence, although mobile communication terminals are located within an identical service area, they may obtain different results in determination of the service suitability of the serving cell. That is, even when a serving cell is in reality in a suitable state, a mobile communication terminal may determine that the serving cell is unsuitable for a communication service.

SUMMARY OF THE INVENTION

The present invention has been made in view of the above problems, and an object of the present invention is to provide a cell reselection method and mobile terminal using the same wherein errors in serving cell suitability determination are reduced to enhance stability of a communication service.

Another object of the present invention is to provide a cell reselection method and mobile terminal using the same wherein errors in determination of the suitability of a serving cell due to internal processing variations are reduced.

In accordance with the present invention, there is provided a cell reselection method for a mobile communication terminal, including calculating first path loss parameters of a serving cell and neighboring cells; determining whether the serving cell is suitable for a communication service using the first path loss parameter thereof; performing, if the serving cell is determined to be unsuitable, a cell reselection operation; calculating, if no suitable cell is found through the cell reselection operation, a second path loss parameter of the serving cell using information on the distance of a base station of the serving cell to the mobile communication terminal; redetermining whether the serving cell is suitable using the second path loss parameter thereof; and setting an operation mode of the mobile communication terminal on the basis of the redetermination result.

Preferably, in the setting step, the operation mode is switched to a no-service mode if the serving cell is determined to be unsuitable using the second path loss parameter, and otherwise the serving cell is retained.

Preferably, in the determining step, the first path loss parameter of the serving cell is compared with a preset minimum reference value for service suitability, and the serving cell is determined to be unsuitable if the first path loss parameter is less than the minimum reference value.

Preferably, in the redetermining step, the second path loss parameter of the serving cell is compared with another preset minimum reference value for service suitability, and the serving cell is determined to be unsuitable if the second path loss parameter is less than the minimum reference value.

Preferably, the minimum reference values are zero.

The calculating a second path loss parameter step includes computing an error compensation value for the first path loss parameter using the distance information received from the base station of the serving cell; and adding the error compensation value to the first path loss parameter to produce the second path loss parameter.

Preferably, the error compensation value is inversely proportional to the distance of the base station of the serving cell to the mobile communication terminal.

Preferably, in the computing step, the distance from the base station of the serving cell to the mobile communication terminal is estimated using a timing advance value received from the base station, and the estimated distance and the serving cell size is considered.

The calculating a second path loss parameter step further includes determining whether the distance information from the base station is still valid; sending, if the distance information is invalid, a request for new distance information to the base station; and receiving the new distance information.

Preferably, the validity of the distance information is determined by determining whether a preset time period has elapsed from reception of the distance information.

In accordance with another embodiment of the present invention, there is provided a mobile communication terminal including a wireless communication unit for exchanging cell state information with base stations of a serving cell and of neighboring cells; and a controller for calculating a first path loss parameter of each cell. The controller also calculates a second path loss parameter of the serving cell using the cell state information to determine an amount of path loss in the serving cell, and selects a new serving cell using the calculated first and second path loss parameters.

Preferably, the controller performs a cell reselection operation if the first path loss parameter of the serving cell is less than a preset minimum reference value for service suitability; calculates, a second path loss parameter of the serving cell using information on the distance of the base station of the serving cell to the mobile communication terminal if no suitable cell is found through the cell reselection operation; and redetermines whether the serving cell is suitable using the second path loss parameter.

Preferably, the controller switches the mode of operation of the mobile communication terminal to a no-service mode if the serving cell is determined to be unsuitable using the second path loss parameter, and retains the serving cell otherwise.

Preferably, the controller computes an error compensation value for the first path loss parameter using distance information received from the base station of the serving cell, and adds the error compensation value to the first path loss parameter to produce the second path loss parameter.

Preferably, the error compensation value computed by the controller is inversely proportional to the distance of the base station of the serving cell to the mobile communication terminal.

Preferably, the controller produces the error compensation value by estimating the distance of the base station of the serving cell to the mobile communication terminal using a timing advance value received from the base station, and considering the estimated distance and the serving cell size.

Preferably, the controller determines whether the distance information from the base station is still valid, and receives, if the distance information is invalid, new distance information for computation of the error compensation value.

Preferably, the controller determines that the distance information is invalid if a preset time period has elapsed from reception of the distance information.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
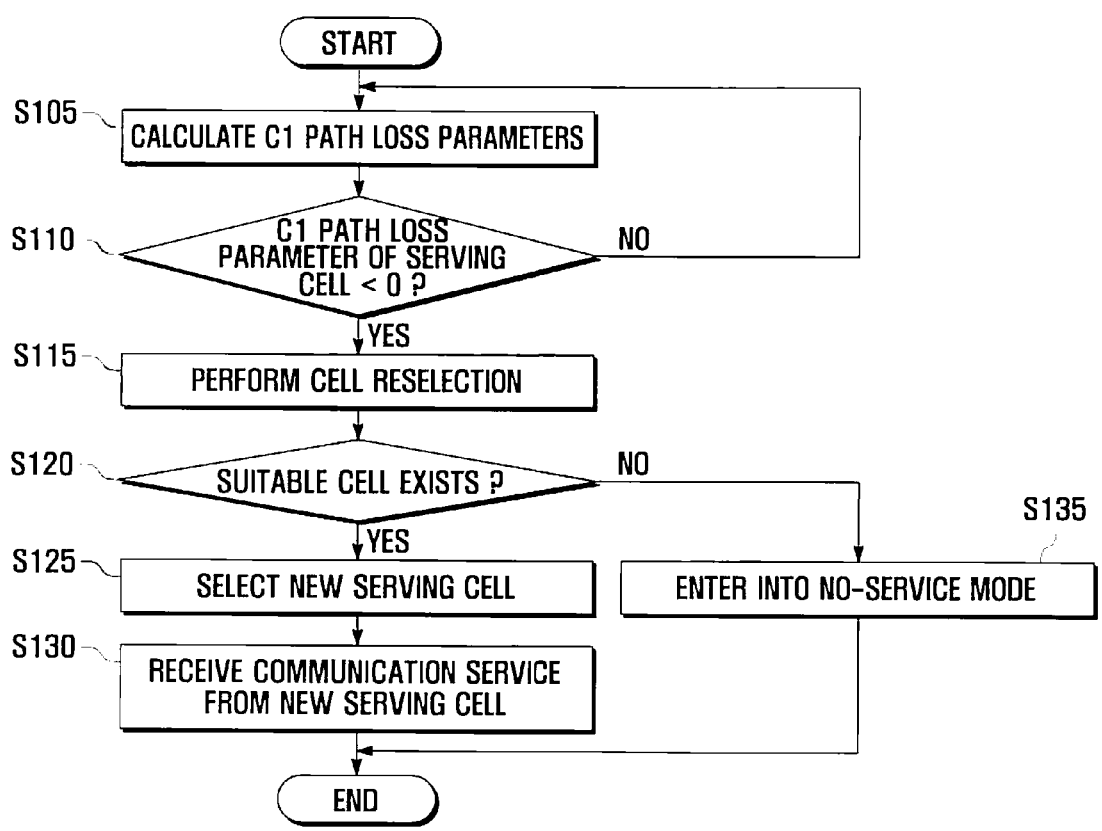
FIG. 1 is a flow chart illustrating processing steps of a conventional cell reselection procedure.

Hereinafter, preferred embodiments of the present invention are described in detail with reference to the accompanying drawings. The same reference symbols identify the same or corresponding elements in the drawings. Some constructions or processes known in the art may be not described to avoid obscuring the invention with unnecessary details.

Figure 2:
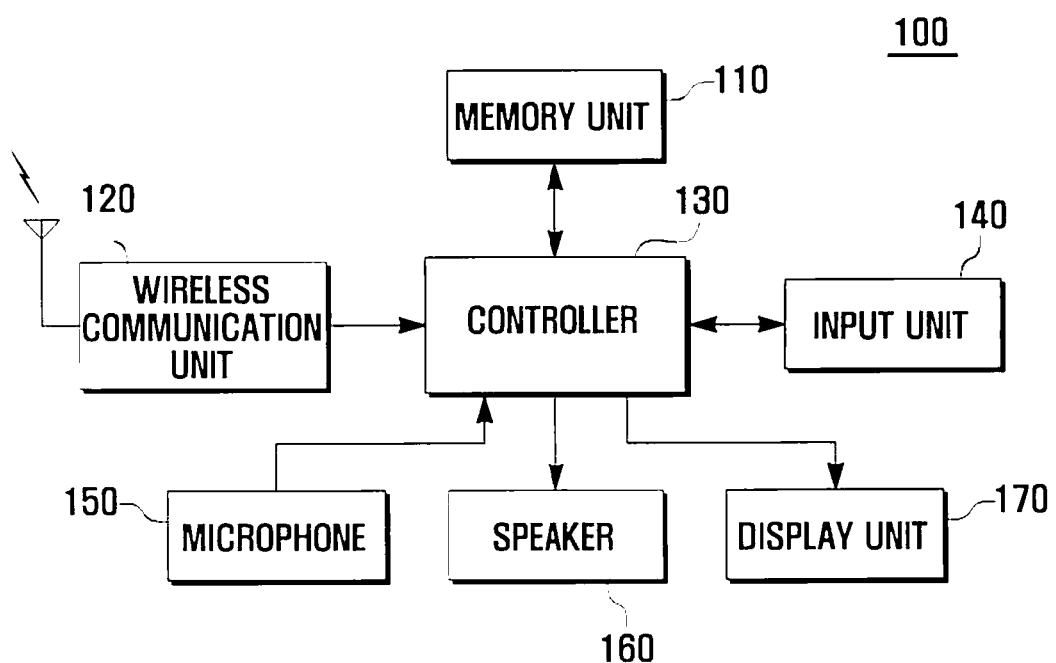
FIG. 2 illustrates a configuration of a mobile communication terminal according to an exemplary embodiment of the present invention.

Referring to FIG. 2, the mobile communication terminal 100 includes a memory unit 110, a wireless communication unit 120, a controller 130, an input unit 140, a microphone 150, a speaker 160, and a display unit 170.

The memory unit 110 stores information regarding operation of the mobile communication terminal 100 (for example, operation programs and associated data).

The input unit 140 provides an interface to the user for operational control of the mobile communication terminal 100. For example, the input unit 140 includes a keypad, whereby a key signal through the keypad from the user sends the key signal to the controller 130.

The controller 130 controls operation of the mobile communication terminal 100 on the basis of signals input through the input unit 140 and operation programs pre-stored in the memory unit 110. In particular, the controller 130 periodically receives cell state information from base stations of a current cell and neighboring cells. To estimate the amount of path loss in the current cell, the controller 130 receives cell service-related information from the base station of the current cell, calculates a first path loss parameter (a C1_original parameter) and a second path loss parameter (a C1_new parameter) using the received cell service-related information. The controller 130 performs a cell reselection operation if necessary using the calculated C1_original and C1_new parameters. That is, if the C1_original parameter of the current cell is less than a preset minimum reference value (for example, zero) for service suitability, the controller 130 performs a cell reselection operation. Here, a first path loss parameter (C1_original parameter) of a cell is calculated by the formula given by Expression 1. Namely, C1_original parameters correspond to C1 path loss parameters in the related art.

If no suitable cell is found through the cell reselection operation, the controller 130 calculates a C1_new parameter of the current cell, and redetermines the suitability of the current cell using the C1_new parameter. In calculation of a C1_new parameter of a cell, the distance from the mobile communication terminal 100 to a corresponding base station is considered (for example, in the form of a timing advance value in the GSM system). In redetermination of the suitability of the current cell, if the C1_new parameter of the current cell is less than the minimum reference value (for example, zero) set in advance, the controller 130 switches the operation mode to a no-service mode; otherwise, the controller 130 retains the current cell.

For calculation of the C1_new parameter of the current cell, the controller 130 receives distance information (for example, a timing advance value in the GSM system) from the corresponding base station, computes an error compensation value using the received distance information in order to compensate the C1_original parameter, and adds the error compensation value to the C1_original parameter to produce the C1_new parameter. Preferably, the error compensation value is inversely proportional to the distance of the base station to the mobile communication terminal 100. For example, if the mobile communication terminal 100 is a GSM terminal, the controller 130 estimates the distance from the base station to the mobile communication terminal 100 using a timing advance value received from the base station, and computes an error compensation value by considering the estimated distance and the serving cell size.

A second path loss parameter (a C1_new parameter) of a cell can be computed using Equations 2 and 3.

$$C1\_new = C1\_original + (MAX\_DISTANCE/K1 - K2*TA/2). \quad (2);$$

$$C1\_new = C1\_original + (MAX\_DISTANCE/K1 - K2*TD). \quad (3),$$

where C1_original denotes a first path loss parameter of the cell, MAX_DISTANCE denotes the cell size (ideally, 35 Km in the GSM), TA and TD are timing distance value and timing delay value denoting information on the distance of a base station to the mobile communication terminal 100, and K1 and K2 are scaling constants.

Further, the controller 130 determines whether distance information is still valid. Preferably, if the distance information is invalid, the controller 130 sends a request for new distance information to the base station of the current cell, and uses the new distance information received in return for further processing. Preferably, the controller 130 sends a request for new distance information through a random access channel (RACH), and receives in return the new distance information through an access grant channel (AGCH). In general, the mobile communication terminal 100 receives distance information from the base station during location registration, and periodically receives distance information thereafter. Hence, the controller 130 preferably determines the validity of distance information by determining whether a preset time period has elapsed from reception of the distance information.

The wireless communication unit 120 provides an interface to a wireless communication network. For example, under the control of the controller 130, the wireless communication unit 120 transmits data to or receives data from the wireless communication network. Preferably, the wireless communication unit 120 exchanges cell state information with a base station of the current cell.

The microphone 150 receives an acoustic signal (for example, a voice signal of the user) from the surrounding environment and transmits the acoustic signal to the controller 130. Under the control of the controller 130, the speaker 160 outputs an acoustic signal, and the display unit 170 outputs a visual signal.

Figure 3:
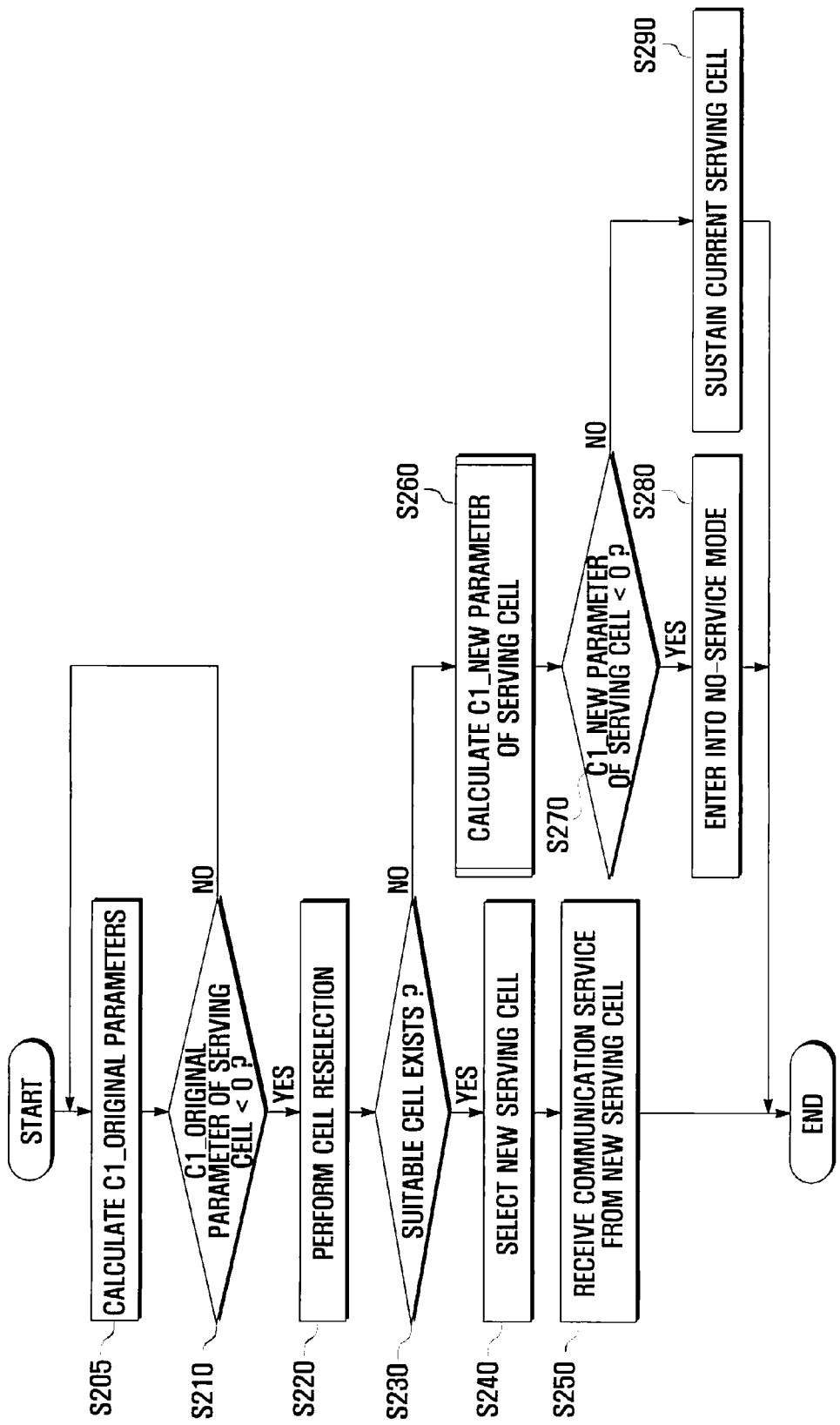
FIG. 3 is a flow chart illustrating processing steps of a cell reselection method according to another exemplary embodiment of the present invention.

FIG. 3 is a flow chart illustrating processing steps of a cell reselection method according to another exemplary embodiment of the present invention. Referring to FIGS. 2 and 3, the cell reselection method is described as follows.

The controller 130 periodically calculates C1_original parameters (first path loss parameters) of a serving cell (or a current cell) and neighboring cells at step S205. Thereto the controller 130 periodically measures the power of a broadcast channel signal of each cell through the wireless communication unit 120. For example, in the GSM system or GPRS system, a mobile communication terminal repeatedly measures at least every 5 seconds the power of a signal on a broadcast control channel (BCCH) of each of a serving cell and neighboring cells in order to calculate corresponding C1_original parameters.

The C1_original parameter of a cell is calculated using Equation 1. A C1_original parameter corresponds to a C1 path loss parameter in Equation 1.

After calculating the C1_original parameters, the controller 130 determines whether the C1_original parameter of the serving cell is less than zero at step S210. If the C1_original parameter is less than zero, the controller 130 performs a cell reselection operation at step S220. It is considered impossible for the mobile communication terminal 100 to receive a communication service from the serving cell whose C1_original parameter is less than zero, owing to a large amount of path loss in the serving cell.

If at least one suitable cell that can provide a communication service is found through the cell reselection operation at step S230, the controller 130 selects one of the found suitable cells as a new serving cell in step S240, and receives a communication service from the new serving cell in step S250.

If no suitable cell is found, to reevaluate the validity of the previous determination of the serving cell as being unsuitable using the C1_original parameter, the controller 130 calculates a C1_new parameter of the current cell in consideration of information on the distance from the base station of the serving cell to the mobile communication terminal 100 in step S260. Calculation of the C1_new parameter is illustrated in FIG. 4, and is described later.

The controller 130 determines whether the C1_new parameter is less than zero at step S270. If the C1_new parameter is less than zero, the controller 130 switches the mode of operation of the mobile communication terminal 100 to a no-service mode in step S280. Otherwise, the controller 130 retains the current serving cell at step S290.

Figure 4:
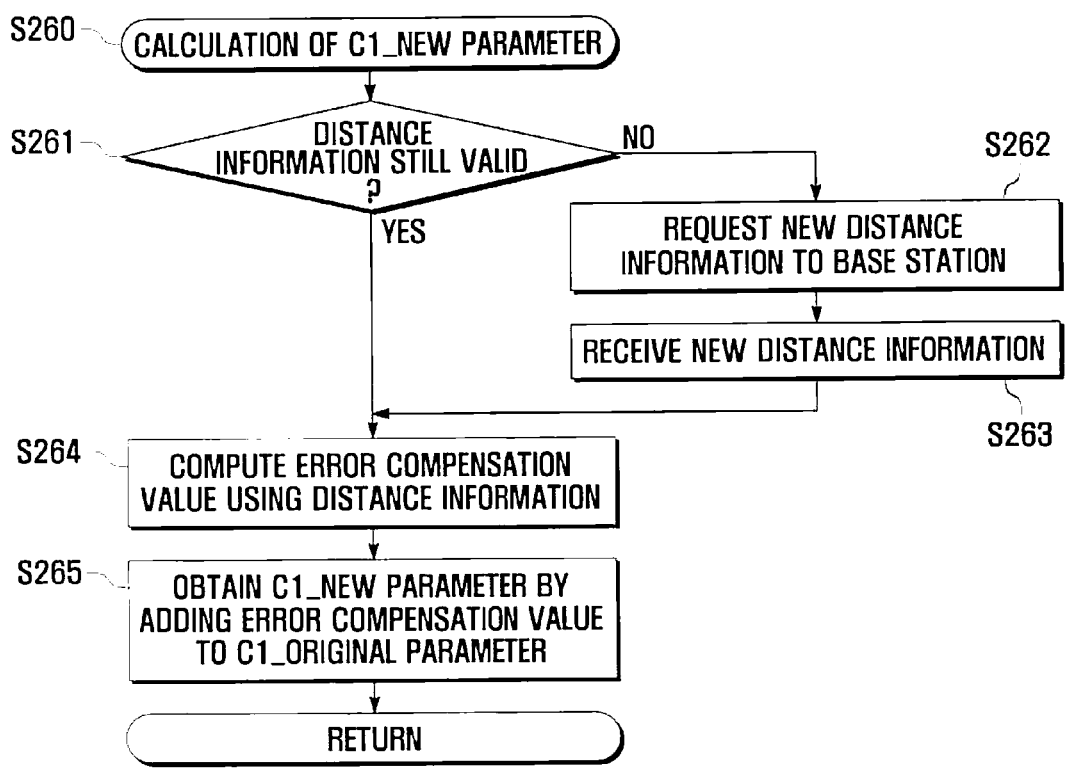
FIG. 4 is a flow chart illustrating a step in the method of FIG. 3 of calculating a second path loss parameter.

FIG. 4 is a flow chart illustrating the step of calculating a C1_new parameter (step S260 in FIG. 3). Referring to FIGS. 2 and 4, C1_new parameter calculation is described as follows.

The controller 130 determines whether information on the distance to the base station of the serving cell is still valid in step S261. This is because the distance to the base station is computed using distance information (for example, a timing advance value in the GSM system) received from the base station. In general, the mobile communication terminal 100 receives distance information from the base station during location registration, and periodically receives distance information thereafter. Hence, the controller 130 preferably determines the validity of distance information by determining whether a preset time period has elapsed from reception of the distance information.

Preferably, if the distance information is determined to be invalid at step S261, the controller 130 sends a request for new distance information to the base station of the current cell in step S262, and receives in return the new distance information in step S263.

The controller 130 computes an error compensation value using the distance information in order to compensate the C1_original parameter in step S264, and obtains a C1_new parameter by adding the error compensation value to the C1_original parameter in step S265. Preferably, the error compensation value is inversely proportional to the distance of the base station of the serving cell to the mobile communication terminal 100. That is, the controller 130 estimates the distance from the base station to the mobile communication terminal 100 using a timing advance value received from the base station, and computes an error compensation value by considering the estimated distance and the serving cell size.

A second path loss parameter (a C1_new parameter) of a cell can be computed using Equations 2 and 3.

As apparent from the above description, the present invention provides a cell reselection method and mobile communication terminal using the same wherein second path loss parameters reflecting distances to corresponding base stations are utilized, thereby reducing errors in determination of the suitability of a serving cell due to internal processing variations. That is, in the serving cell suitability determination, a first path loss parameter computed by the mobile communication terminal and a second path loss parameter computed using distance information received from the base station are applied together. Hence, errors in determination of the suitability of the serving cell may be reduced, enhancing stability of a communication service for the user. In reality, while a mobile communication terminal is in a no-service mode, changing the value of the C1 path loss parameter to a value greater than zero without change of a location thereof has enabled transmission and reception operations of the mobile communication terminal.

While preferred embodiments of the present invention have been shown and described in this specification, it will be understood by those skilled in the art that various changes or modifications of the embodiments are possible without departing from the spirit and scope of the invention as further defined by the appended claims.

We claim:
1. A cell reselection method for a mobile communication terminal, the cell reselection method comprising:
calculating first path loss parameters of a serving cell and neighboring cells;
determining whether the serving cell is suitable for a communication service using the first path loss parameter thereof;
performing, if the serving cell is determined to be unsuitable, a cell reselection operation;
calculating, if no suitable cell is found through the cell reselection operation, a second path loss parameter of the serving cell using information on a distance from a base station of the serving cell to the mobile communication terminal;
redetermining whether the serving cell is suitable using the second path loss parameter thereof; and
setting a mode of operation of the mobile communication terminal on the basis of the redetermination result,
wherein calculating the second path loss parameter further comprises:
computing an error compensation value for the first path loss parameter using the distance information of the serving cell to the mobile communication terminal, received from the base station of the serving cell; and
adding the error compensation value to the first path loss parameter to produce the second path loss parameter.

2. The cell reselection method of claim 1, wherein in the setting step, the mode of operation is switched to a no-service mode if the serving cell is determined to be unsuitable using the second path loss parameter, and otherwise the serving cell is retained.

3. The cell reselection method of claim 1, wherein in the determining step, the first path loss parameter of the serving cell is compared with a preset minimum reference value for service suitability, and the serving cell is determined to be unsuitable if the first path loss parameter is less than the minimum reference value.

4. The cell reselection method of claim 1, wherein in the redetermining step, the second path loss parameter of the serving cell is compared with a preset minimum reference value for service suitability, and the serving cell is determined to be unsuitable if the second path loss parameter is less than the minimum reference value.

5. The cell reselection method of claim 4, wherein the minimum reference value is zero.

6. The cell reselection method of claim 1, wherein the error compensation value is inversely proportional to the distance of the base station of the serving cell to the mobile communication terminal.

7. The cell reselection method of claim 1, wherein in the computing step, the distance from the base station of the serving cell to the mobile communication terminal is estimated using a timing advance value received from the base station, and the estimated distance and the serving cell size is considered.

8. The cell reselection method of claim 1, wherein the calculating a second path loss parameter step further comprises:
determining whether the distance information from the base station is still valid;
sending, if the distance information is invalid, a request for new distance information to the base station; and
receiving the new distance information.

9. The cell reselection method of claim 8, wherein the validity of the distance information is determined by determining whether a preset time period has elapsed from reception of the distance information.

10. A mobile communication terminal comprising:
a wireless communication unit for exchanging cell state information with base stations of a serving cell and of neighboring cells; and
a controller for calculating a first path loss parameter of each cell and a second path loss parameter of the serving cell using the cell state information to determine an amount of path loss in the serving cell, and for selecting a new serving cell using the calculated first and second path loss parameters, wherein the controller performs, if the first path loss parameter of the serving cell is less than a preset minimum reference value for service suitability, a cell reselection operation; calculates, if no suitable cell is found through the cell reselection operation, a second path loss parameter of the serving cell using information on a distance from the base station of the serving cell to the mobile communication terminal; and redetermines whether the serving cell is suitable using the second path loss parameter,
wherein the controller computes an error compensation value for the first path loss parameter using distance information of the serving cell to the mobile communication terminal, received from the base station of the serving cell, and adds the error compensation value to the first path loss parameter to produce the second path loss parameter.

11. The mobile communication terminal of claim 10, wherein the controller switches a mode of operation of the mobile communication terminal to a no-service mode if the serving cell is determined to be unsuitable using the second path loss parameter, and retains the serving cell otherwise.

12. The mobile communication terminal of claim 10, wherein the minimum reference value is zero.

13. The mobile communication terminal of claim 10, wherein the error compensation value computed by the controller is inversely proportional to the distance from the base station of the serving cell to the mobile communication terminal.

14. The mobile communication terminal of claim 10, wherein the controller produces the error compensation value by estimating the distance from the base station of the serving cell to the mobile communication terminal using a timing advance value received from the base station, while considering the estimated distance and serving cell size.

15. The mobile communication terminal of claim 10, wherein the controller determines whether the distance information from the base station is still valid, and receives, if the distance information is invalid, new distance information for computation of the error compensation value.

16. The mobile communication terminal of claim 15, wherein the controller determines whether the distance information is invalid if a preset time period has elapsed from reception of the distance information.

\* \* \* \* \*